UNITED STATES PATENT OFFICE.

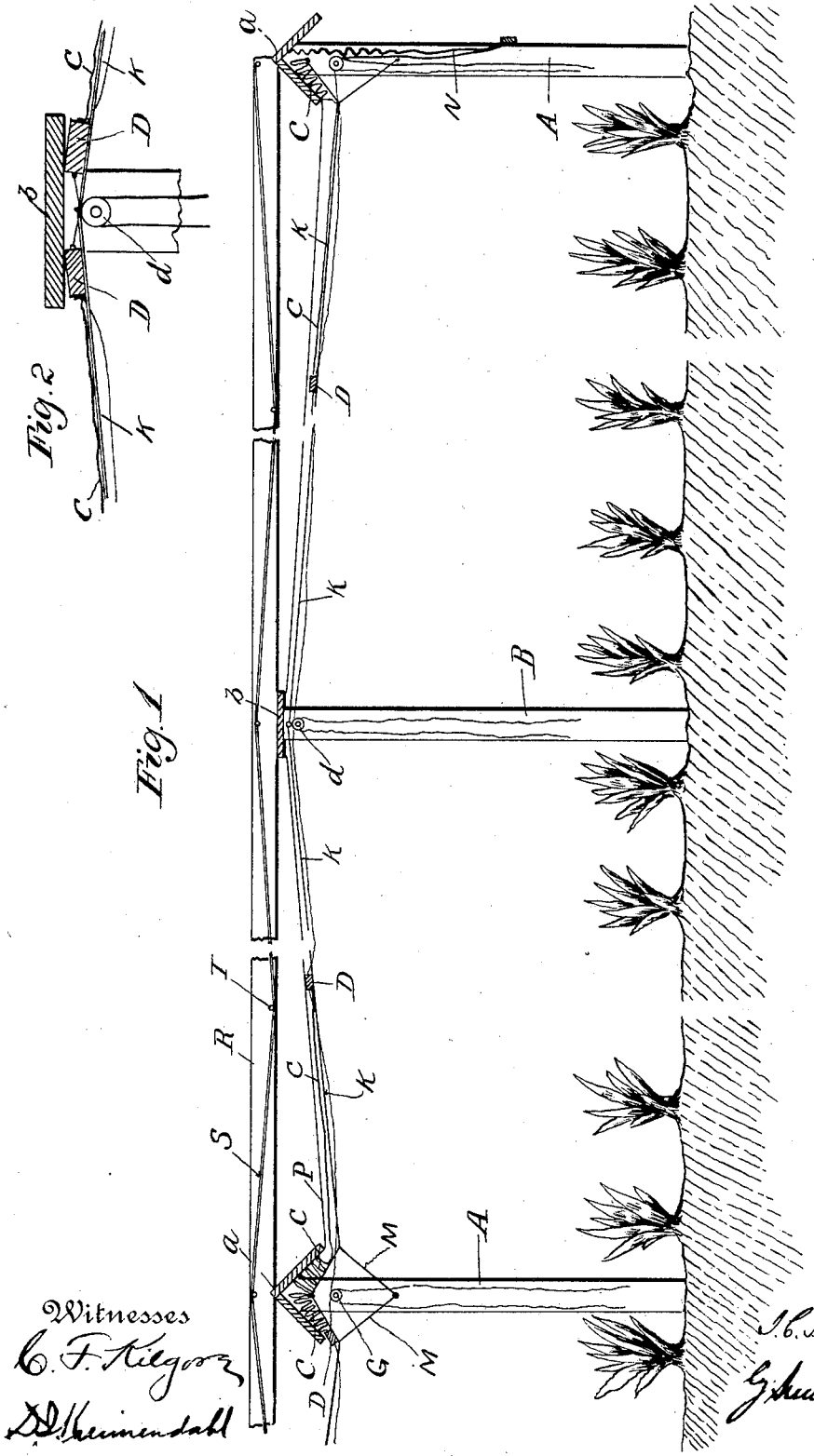

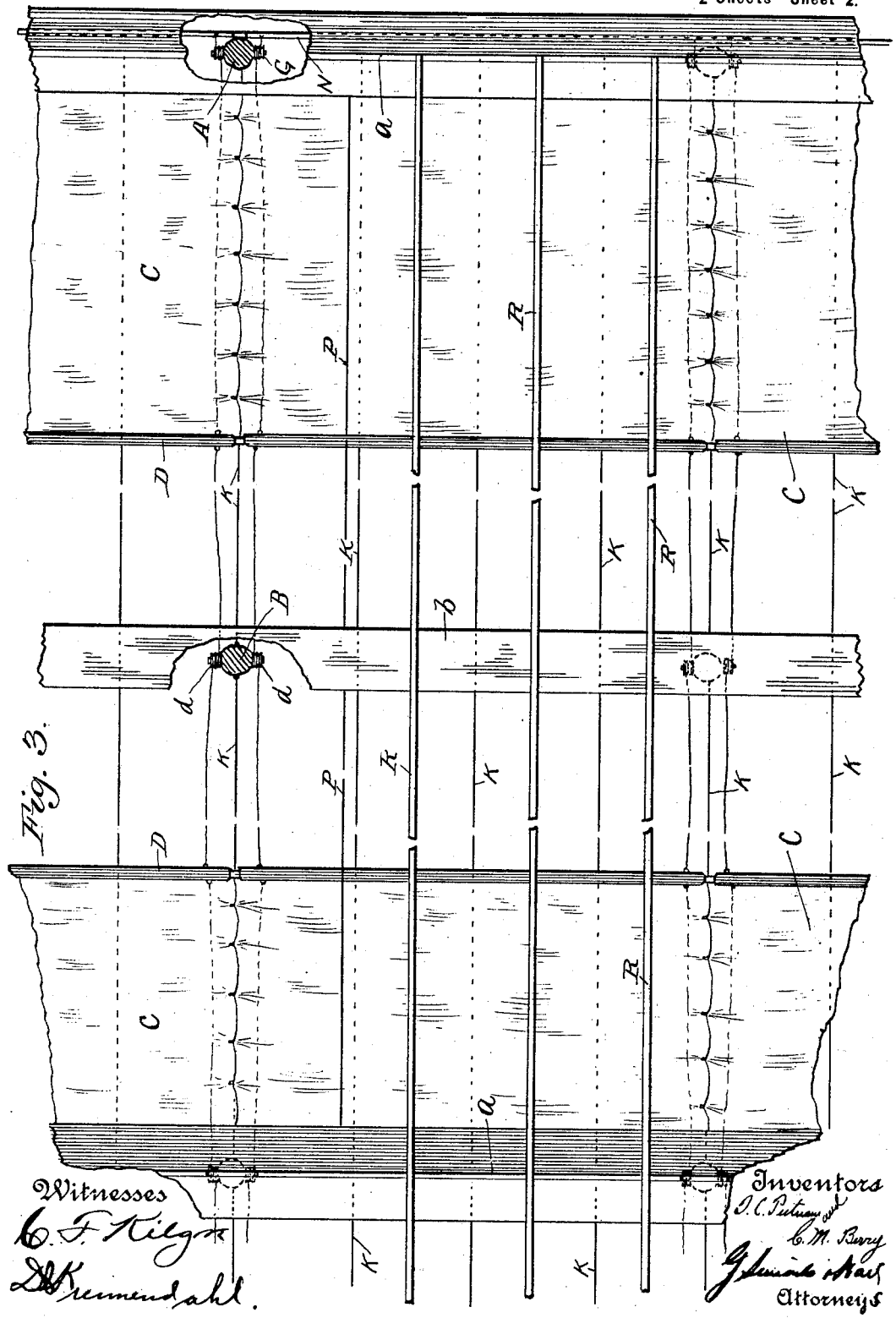

ISRAEL C. PUTNAM AND CYRUS M. BERRY, OF ORLANDO, FLORIDA.

FRUIT OR VEGETABLE PROTECTOR.

SPECIFICATION forming part of Letters Patent No. 711,225, dated October 14, 1902.

Application filed November 22, 1901. Serial No. 83,274. (No model.)

*To all whom it may concern:*

Be it known that we, ISRAEL C. PUTNAM and CYRUS M. BERRY, citizens of the United States, and residents of Orlando, county of Orange, State of Florida, have invented certain new and useful Improvements in Fruit or Vegetable Protectors, of which the following is a full, clear, and exact description, whereby any one skilled in the art can make and use the same.

This invention relates to a removable protecting-cover for crops, such as fruits and vegetables, which are grown out of doors, and has for its object to provide a device of the kind specified having features of novelty and advantage.

In Figure 1 of the drawings we have illustrated in a side sectional view a bed of vegetables with our protecting shed or cover arranged in connection therewith. In Fig. 2 is shown on enlarged scale a detail of the construction. Fig. 3 is a top view showing the details of construction.

The growers of fruits and vegetables, particularly in the semitropical climates, are constantly in danger of excessive loss by reason of the sudden changes in climatic conditions, which ruin their crops. The sudden changes which are mostly feared are frosts and the sudden falling of temperature after a rain, which is liable to freeze and ruin the crops. Hail and wind storms are also sources of considerable damage and are to be guarded against especially by growers of tobacco, garden-truck, &c., in many climates. Attempts have been made to provide a suitable shed or protection for such crops as are easily affected by weather conditions, and it is an important consideration that the sheds be so made that normally they shall be rolled up and out of the way when the weather conditions are favorable, but may be easily spread and the beds covered quickly upon the approach of a storm or a cold wave. The great objections to devices heretofore provided for these purposes is that they are not easily and readily operated, that they are heavy and cumbersome, and very expensive to put up and maintain. The arrangement and construction herein described and shown accomplishes all the desired results of such a device and is inexpensive and easily and quickly operated.

As is well known, the plants are set out in regular and orderly rows, and we propose to set up at intervals of ten or fifteen or any desired number of rows series of rows of posts. The posts in one row, as at A, are connected at their tops by an inverted-V-shaped shed, as $a$. The posts in the next row are united by a plain flat board $b$, and this arrangement is carried out throughout the length of the field, rows of posts connected by the inverted-V-shaped sheds $a$ alternating with the rows of posts connected with the flat boards $b$. Under the V-shaped sheds is fastened in any desired manner, as by tacks or staples, one edge of a curtain C, which is normally brailed or folded up under the shade to protect it from rain, so as not to subject it to excessive and unnecessary wear. The free edges of these curtains are secured to poles D, and to these poles are connected ropes, which pass over pulleys secured to the posts B under the sheds $b$. A curtain is arranged on each side of the posts A, and the ropes connected to the curtain-poles D, which are arranged to move toward one another when the cover is being spread, are passed over pulleys or a double pulley $d$, secured to the post B under the shed $b$. It will be seen from this construction that when the curtains are brailed up under the sheds A by pulling the ropes under a single shed $b$ both curtains may be extended and drawn up until the curtain-poles D are wedged in under the shed $b$, as shown on enlarged scale in Fig. 2. This wedging of the poles D under the sheds B affords effectual seal against the admission of rain or sleet or hail, and as it is customary in times of severe cold to build fires on the ground under the covers it also serves to keep this artificial heat in and to spread it over the field. Ropes are also secured to the curtain-poles D, which pass over pulleys G, which are secured to the posts A, and by these means we are enabled to brail up two curtains at the same time under the sheds A when the necessity for their use has passed. In order to support the curtain-poles and the curtains as they are unbrailed and brailed, we provide wires $k$, which extend from pole to pole, these wires being anchored down to the posts A, as indicated at M, to allow a space between the shed A and the wire for the curtain and pole to be drawn up under the shed. We also provide wires stretched between the rows of posts, as at P, to prevent the lifting of the curtains by winds. At the ends of the field curtains N are secured under the sheds A and are arranged to be dropped down to the ground to form a side wall, these curtains being brailed up in much the same manner as the top curtains.

The rows of posts are tied together by stringers to keep them in line. These stringers are made up of beams R, set on edge and secured to the sheds, bridging the spaces between the rows. Wires S are secured near the upper edge of these beams on each row of posts and are pulled down and stapled at the lower edge of the beams substantially half-way between the rows of posts, as shown at T. These wires thus secured to the beams constitute a kind of a truss or brace, which adds materially to the stiffness and rigidity of the stringers.

The individual curtains are of any convenient width, and curtain-poles are attached to the free ends of each curtain. These are arranged side by side throughout the length of the fields, and the curtain-poles are united to one another end for end in any desired way, as by a screw-and-socket connection. (Shown in Fig. 3.) The contiguous edges of the curtains are to be secured together, as by hooks and eyes. The effect of this construction is to produce a continuous solid curtain of any length desired, this length being determined by the length of the rows of posts. This sectional construction of the curtains is particularly advantageous when in a large field there are crops of different kinds which require different conditions of heat and cold for their development and protection, inasmuch as we are enabled to spread and use just as much of the curtain as is necessary.

It will be noted that when the curtains are spread they are inclined upwardly toward the posts B and that the rows of posts are set between the rows of the plants. We have purposely so constructed our cover so that in case of rain the water will run down the curtains toward the posts A and seep through the curtain into the ground between the rows of plants. This effectually protects the plants and trees from being wet by the cold rain. The construction herein described and illustrated is a lighter and cheaper construction than any heretofore devised, it is much more readily and easily operated, and is far more efficient in affording a suitable protection for the crops against the action of the elements.

We do not desire to limit ourselves to the precise construction and materials herein shown and described.

We claim as our invention—

1. A device of the kind described comprising a series of rows of posts, sheds connecting the posts in each row, curtains secured under the sheds of alternate rows of posts one on each side thereof and normally gathered up thereunder, and means for extending said curtains to cover the spaces intervening between the rows of posts, substantially as described.

2. In a device of the class specified a series of rows of posts, sheds connecting the posts in each row, sectional curtains normally brailed up under the sheds of alternate rows and having one end secured thereunder, means for connecting the adjacent edges of these curtains together, and means for extending said sections together to cover the spaces intervening between the rows of posts, substantially as described.

3. In a device of the class specified a series of rows of posts, sheds connecting the posts in each row, curtains normally brailed under the sheds of alternate rows and having one end secured thereunder, poles secured to the free ends of said curtains and means connected with the said poles for unbrailing said curtains, said poles coacting with the sheds on the intervening rows of posts, substantially as described and for the purposes set forth.

4. In a protecting-cover for fruits, vegetables, &c., rows of posts arranged at intervals and set up between rows of plants, a continuous shed connecting the posts in each row, curtains having one end secured underneath the sheds of alternate rows one on each side of the posts, said curtains being normally brailed up under said sheds, and means connected with the free ends of said curtains and connected with mechanism located under the sheds of the intervening rows of posts for spreading said curtains.

5. A protecting shed or cover for fruits, vegetables &c., comprising rows of posts arranged substantially as described, curtains secured at one end to alternate rows of posts, and mechanism mounted on the intervening rows of posts for unbrailing said curtains, substantially as described.

6. In a device of the class specified, rows of posts arranged at intervals, curtains arranged side by side and secured at one end to alternate rows of posts, poles secured to the free ends of said curtains, means for connecting the adjacent ends of the poles and edges of the curtain together and means for brailing and unbrailing said curtains, substantially as described.

7. In a device of the class specified rows of posts arranged at intervals, sheds connecting the posts in each row, curtains secured at one end to alternate rows of posts, and means for brailing and unbrailing them, said curtains in their extending position being inclined.

8. In a device of the class specified rows of posts arranged at intervals, sheds connecting the posts in each row, and stringers having wire stiffening-braces, substantially as described, and for the purposes set forth.

ISRAEL C. PUTNAM.
CYRUS M. BERRY.

Witnesses:
THOMAS E. F. HOSKINS,
WILLIAM C. BERRY.